Jan. 27, 1948.  H. L. McPHERSON  2,435,048
ANTIGROUND-LOOP BRAKE
Filed May 2, 1946  2 Sheets—Sheet 2
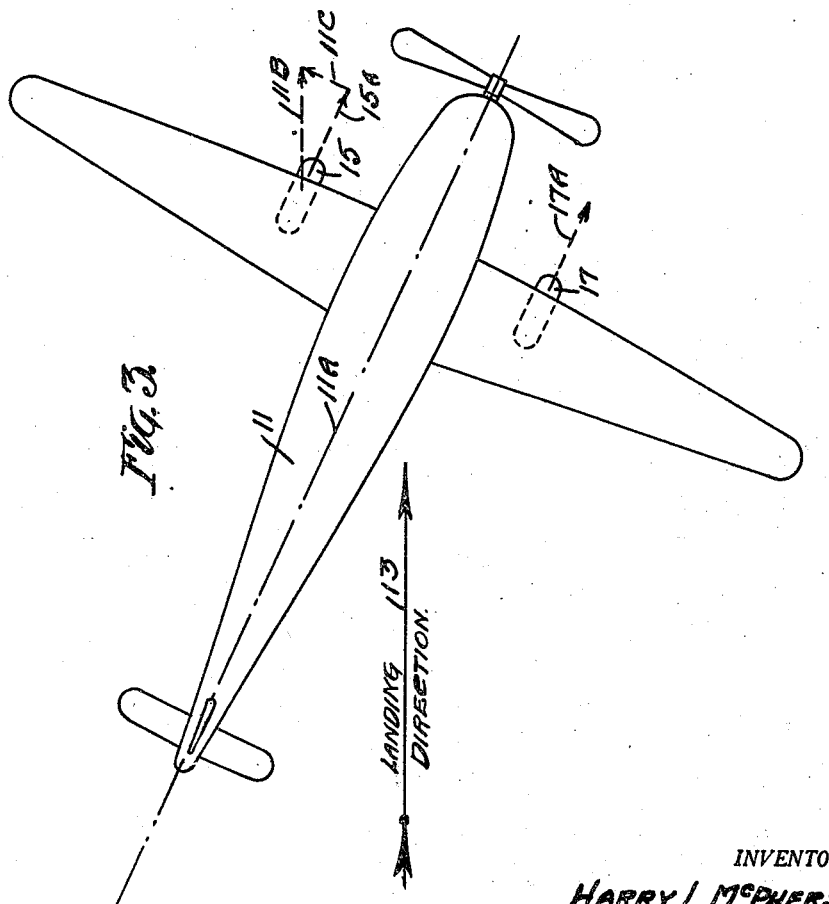
INVENTOR.
HARRY L. McPHERSON
BY
J. H. Weatherford
Atty.

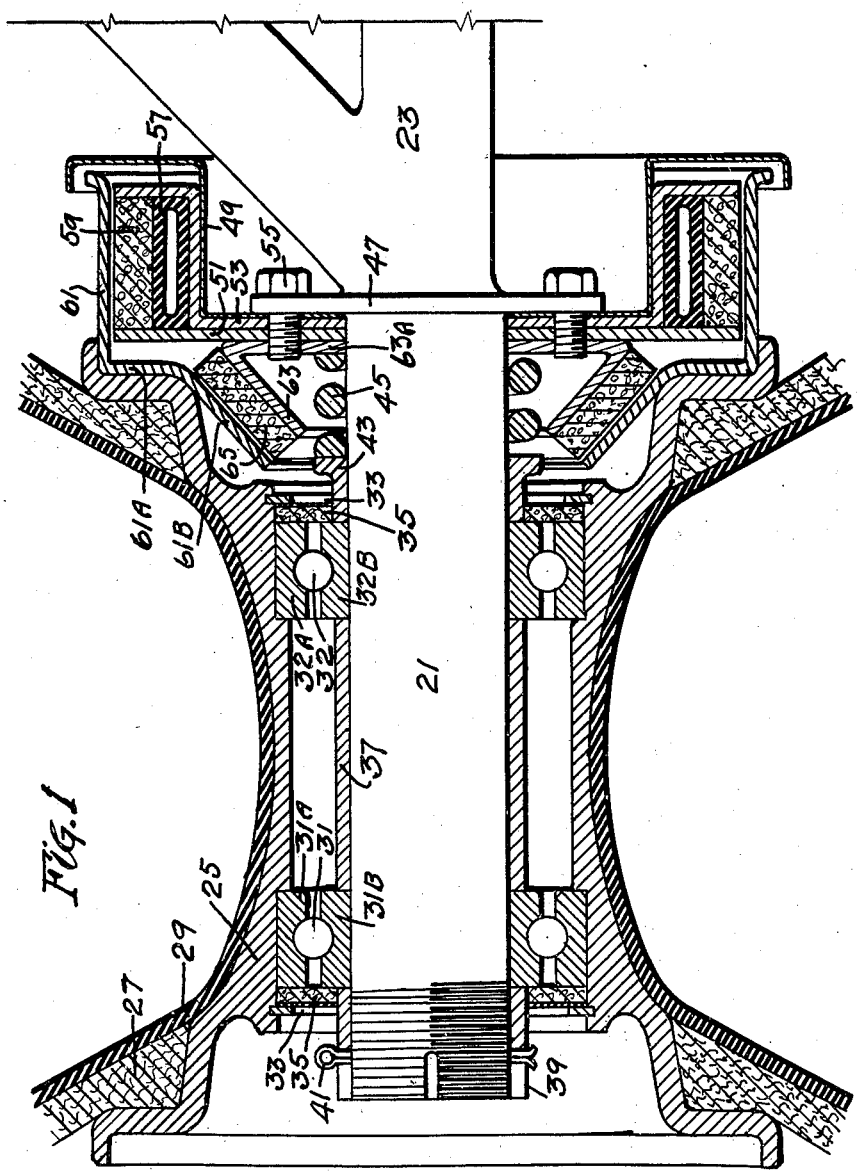

Patented Jan. 27, 1948

2,435,048

UNITED STATES PATENT OFFICE 2,435,048

ANTIGROUND-LOOP BRAKE

Harry L. McPherson, Memphis, Tenn., assignor of one-fourth to J. H. Weatherford and one-fourth to Heiskell Weatherford, Memphis, Tenn.

Application May 2, 1946, Serial No. 666,623

21 Claims. (Cl. 244—111)

The present invention relates to auxiliary braking means which comes into play where there is an excessive side thrust, either in landing or during taxiing after landing, and particularly to braking means which tend to prevent ground looping.

Airplanes are ordinarily equipped with a pair of landing wheels spaced well apart on the laterally opposite sides of the plane and toward the forward end of the fuselage, these wheels being equipped with brakes which are manually applied after landing, to slow down and bring the plane to a stop.

In landing the plane the longitudinal axis of the plane is ordinarily parallel to the direction of landing and there is little or no side thrust on the wheels. It, however, happens, particularly where there is a cross wind, and sometimes through carelessness or otherwise, that the longitudinal axis of the plane is not parallel to the line of landing and when this is true, the wheels as set down on the runway at an angle to the direction in which the plane is landing and undesirably tend to carry the plane out of line. Additionally, the tail end of the plane tends to further swing out of line and an undesirable condition known as ground looping is set up. In addition to this, even where the landing is made with the plane alined with the direction of landing, one brake may be applied more heavily than the other, or may partially lock and the plane swing around the more heavily braked wheel, setting up a very similar condition.

In either of these events, there is an increasing tendency to turn and an increasing lateral thrust of the plane against the outer wheel on the turn, tending to tip the plane over on the outer wing and also tending to rip out the wheels and landing gear.

The objects of the present invention are:

To make use of excessive side thrust of a plane in landing, to set up a braking action on the wheel against which the thrust comes, which will tend to check movement of such wheel, and swing the plane back toward the line of direction of landing;

To provide means for utilizing the side thrust of a plane in landing, increasingly effective as the turn progresses and thrust increases, to check the turn and automatically becoming less effective as conditions are corrected;

To provide auxiliary braking means normally inoperative and automatically rendered effective in the event turning movement, establishes excessive side thrust of the plane;

To provide auxiliary braking means and resilient means yielding to excessive side thrust, holding said braking means ineffective in the absence of such excessive thrust.

The means by which the foregoing and other objects are accomplished, and the manner of their accomplishment, will readily be understood from the following specification upon reference to the accompanying drawings, in which:

Fig. 1 is a sectional elevation of the hub and journaling axle of a typical landing wheel of a plane and fragmentary portions of the wheel tire and tube, showing the usual manually operable brake and the auxiliary side thrust brake and associated mechanism of the present invention.

Fig. 2 is a fragmentary sectional elevation of the same wheel hub and axle with a modified form of the auxiliary brake.

Fig. 3 is a diagrammatic plan view of a plane as it lands with the longitudinal axis of the plane at an angle to the direction of landing.

Referring now to the drawings in which the various parts are indicated by numerals:

11 is the fuselage of a plane with the longitudinal axis 11A of the fuselage and the plane at an angle to an arrow 13 indicating the direction of landing, 15 and 17 are the landing wheels which, when set for landing, are parallel to the longitudinal axis 11A of the plane and on landing tend to roll in parallel directions 15A, 17A, parallel to that axis. An arrow 11B parallel to the landing direction arrow 13 indicates the forward component of the landing force on the wheel 15, and an arrow 11C the lateral or overturning thrust on that wheel exerted in landing.

Referring now to Fig. 1, typical of the two wheels, in which the various parts of the mechanism are shown, 21 is the wheel axle which is supported by the usual bracing structure 23, which may be either of the fixed or retractable types well known in plane construction, the axle as shown being substantially horizontal as it is when the plane is landing.

25 is the wheel hub, here indicated also as the tire rim of the wheel, 27 the casing and 29 the inner tube. The wheel hub is journalled on the axle by bearings 31, 32, here indicated as ball bearings, but which may be roller bearings should it be so desired. The hub is annularly counter-bored inward from its opposite ends to receive the outer races 31A, 32A of these bearings, and these races are anchored in such counter-bores in usual manner against the longitudinal movement by split rings 33. 35 are felt sealing washers.

The inner races 31B, 32B are longitudinally slidable along the axle 21 and are spaced rigidly apart by an annular sleeve 37, also slidable along the axle, and are retained at the outer end of the axle by an internally threaded sleeve 39 which is screwed on to complementary threads on the axle and abuts the bearing race 31B. The sleeve preferably is locked, as by a cotter pin 41, the end of the axle being slotted to receive the cotter pin and provide for such adjustment as may be necessary.

Abutting against the inner end of the bearing race 32B is a second sleeve 43 which is slidable along the axle and is restrained from movement by a coil spring 45 which abuts the sleeve 43 and urges the bearings and interposed sleeve 37 against the outer sleeve 39, the strength and compression of this spring being adjusted to prevent any movement except under excessive side thrust of the plane and the axle 21 carried thereby.

As is usual construction, 47 is an annular disc or collar integral with the axle, 49 a thin metal shield, and 51 and 53 plates which are clamped solidly to the disc 47 by cap screws 55, the plate 53 being laterally off-set toward the plane and then extended radially to form with the plate 51 an annular channelway in which are disposed an annular tube 57 and brake lining 59, both of which are held against turning by the wheel axle collar 47.

Rigidly secured to and turning with the wheel hub 25 is an annular member 61, forming a brake drum with which the brake lining cooperates to effect braking of the plane after landing. This braking apparatus is of a very usual type now commonly in use on planes, the brake lining being forced against the drum by hydraulic fluid in the tube 57, flow of the fluid being manually controlled by the operator of the plane.

In the present construction the annular flange 61A of the brake drum extends inward toward the axle and is forwardly converged to form an auxiliary conical brake drum 61B, likewise turning with the wheel. A complementary conical shoe 63 spaced from the drum is secured to the plates 51 and 53 and the axle collar 47, as by turning inward a disc portion 63A, and effecting securement by the cap screws 55.

Brake lining 65 is disposed between the brake drum 61B and the brake shoe 63, this lining being here shown as carried by the shoe, to which it is secured in usual manner. It will be noted that the brake linings 59 and 65 are spaced, as is usual, away from the brake drums 61 and 61B, as the case may be, and interfere in no way with the normal turning movement of the wheel. The spring 45 which abuts at one end against the sleeve 43 abuts at the other end against the disc portion 63A of the auxiliary brake shoe, and maintains under normal conditions the desired spacing of the brake linings 65 and brake drum 61B.

In Fig. 2, the leg 61A of the brake drum 61 is extended straight inward and the brake lining 65A is disposed between the plate 51 and the brake drum leg 61A. The brake lining may be carried either by the drum or by the plate 51, but is here shown as seated against the plate 51, to which it is secured in any usual or desired manner, the construction otherwise being of substantial identity with Fig. 1.

In normal use of the plane, the spring 45 holds the auxiliary brake lining 65 away from the brake drum 61B and the functions of the wheel are in no way interfered with. Should, however, excessive side thrust occur in landing, or under turning movement, as from unequal braking, the spring 45 is compressed and the wheel axle carrying with the auxiliary brake shoe and lining moves toward the wheel hub, this action obviously occurring only on the wheel, in the illustrated instance, the wheel 15, toward which the thrust of the plane occurs, the pull of the opposite axle obviously tending to separate the auxiliary braking surfaces of the wheel 17 and exerting no braking action. The auxiliary braking action continues only so long as the side thrust persists, the braking action on the wheel 15 retarding rotation of that wheel and acting to allow the other and freer running wheel 17 to catch up and straighten out the plane. As this occurs the spring 43 automatically acts to gradually relieve braking action on the wheel 15 and completely accomplishes this as the longitudinal axis of the fuselage approaches the direction of landing of the plane.

It will be understood that the detail of the wheel and axle structure shown are illustrative only and the auxiliary braking mechanism is in detail that which is adapted to such structure and that no claim shall be limited execpt by the detail therein set out.

It will further be understood that the axle here shown is of that type which projects outward from a support which extends, or is shifted to extend, downward from the plane, but that it may be of that type which extends inward from a support, or be carried by a yoke support, depending on the construction of the landing gear of the plane, and that in the claims the term "projecting laterally" is to be interpreted to read on an axle projecting toward, as well as away from, the plane or one extending between the two arms of a fork.

It will still further be understood that the "inner" end of the axle as the term is used in the claims, is that end nearest the center of the plane, and the "outer" end the one remote from the center line.

I claim:

1. In antiground-loop brakes for an airplane, having a pair of landing wheels respectively on opposite sides of said plane, each said wheel having a hub, means independently journalling said wheels, each said means comprising an axle projecting laterally with respect to said plane, and having at its inner end a rigidly carried part, bearings longitudinally fixed in said hub and longitudinally shiftable with said hub, along said axle, resilient means interposed between said hub and said axle-carried part urging shift of said plane away from said wheel, means limiting said shift, and braking means, comprising a first brake member carried by said hub, and a cooperative brake member secured to said axle-carried part in facing relation to said hub carried part and shiftable by lateral thrust of said plane into braking contact with said first brake member.

2. In antiground-loop brakes for an airplane, having a pair of landing wheels on opposite sides of said plane, and axles independently journalling said wheels, said axles projecting laterally away from said plane and having at their inner ends rigidly carried parts, each said wheel being shiftable along its said axle; resilient means interposed between said wheel and said axle-carried part urging shift of said plane away from said wheel, means limiting said shift, braking means comprising brake members respectively fixedly secured to said wheel and said axle, held apart by action of said resilient means, and cooperable to brake said wheel under side thrust of said plane toward said wheel.

3. An antiground-loop brake for an airplane, having laterally projecting axles, each having at its inner end a rigidly carried abutment, landing wheels journalled on said axles and longitudinally shiftable along said axles, resilient means interposed between said wheels and said abutment urging shift of said plane away from said wheel, means limiting said shift, and facing complementary braking members respectively carried by said wheel and said abutment.

4. Antiground-loop brakes for an airplane having opposite, laterally projecting axles, each axle having at its inner end a rigidly carried abutment, and at its outer end removable wheel retaining means, landing wheels journalled on said axles between said abutment and said retaining means and longitudinally shiftable along said axles, cooperative braking means respectively carried by said wheel and said axles, and resilient means interposed between said wheels and said abutments, urging shift of said plane away from said wheel and said braking means into spaced relation, said resilient means being compressible under side thrust of said plane when said plane is supported by said wheels, to effect braking contact of said braking means.

5. Antiground-loop brakes for an airplane having opposite laterally projecting axles, each having at its inner end a rigidly carried collar, and an outwardly facing and braking member carried by said axle, and at its outer end a wheel retaining and shift limiting sleeve, landing wheels journalled on said axles and longitudinally shiftable along said axles, each said wheel carrying an inwardly facing braking member complementary to said axle carried braking member, and resilient means interposed respectively between said wheels, and said collar urging shift of said plane away from said wheels and said braking member apart, said resilient means for either said wheel being compressible under side thrust of said plane toward said wheel, when said plane is supported by said wheels.

6. Antiground-loop brakes for an airplane having laterally opposite axle and landing wheel structures, said structures each comprising an axle, having at its inner end a fixedly attached collar and at its outer end a removable retaining sleeve, and a said landing wheel journalled on and shiftable along said axle and retained thereon by said retaining sleeve; said brakes each comprising a compression spring around said axle interposed between said wheel and said collar urging said wheel against said retaining sleeve and allowing limited shift away therefrom, and complementary braking members respectively carried by said wheel and said collar, said members being held in spaced relation by said spring and shifted into braking relation by compression of said spring under side thrust of said plane toward said wheel, when said plane is supported by said wheels.

7. Antiground-loop brakes for an airplane having laterally opposite axles and landing wheel structures, said structures each comprising an axle, having at its inner end a fixedly attached collar and at its outer end a removable retaining sleeve, and a said landing wheel journalled on said axle through interposed bearings having outer races anchored in said wheel, and an inner race assembly comprising races spaced apart by a spacing sleeve, said inner races and sleeve being slidable along said axle and retained thereon by said retaining sleeve, a compression spring around said axle interposed between said collar and said races urging said inner race assembly against said retaining sleeve and allowing limited shift away therefrom, and complementary braking members respectively carried by said wheel and said collar, said members being held in spaced relation by said spring and shifted into braking relation by compression of said spring under side thrust of said plane, when said plane is supported by said wheels.

8. In an airplane having an axle and a landing wheel, said axle being carried by and projecting laterally with respect to the fuselage of said plane, and having at its inner end a fixedly attached member and at its outer end a removable retaining means, said landing wheel being journalled on said axle and retained thereon by said retaining means; and braking means including a compression spring around said axle interposed between said wheel and said member urging said wheel against said retaining means and allowing limited shift away therefrom, and complementary braking members respectively carried by said wheel and said member, held in spaced relation by said spring and shiftable into braking relation by compression of said spring under side thrust of said plane, when said wheel is in supporting contact.

9. In an airplane having laterally disposed axles, landing wheels journalled on said axles, and means on said axles limiting outward shift of said wheels; antiground-loop braking means in which said wheels are shiftable along their respective said axles, and in which each said axle has a collar portion inwardly spaced from the said wheel carried by said axle, resilient means interposed between said wheel and said collar, urging said wheel against said outer limiting means, and cooperative braking members, respectively carried by said wheel and said collar, and held in spaced relation by said resilient means, and said resilient member is compressible by lateral thrust of said plane when said landing wheel is functioning, to permit braking contact of said braking member.

10. In an airplane having laterally disposed axles, landing wheels journalled on said axles, and means on said axles limiting outward shift of said wheels; antiground-loop braking means, in which said wheels are shiftable along their respective said axles, and in which each said axle has a collar portion inwardly spaced from the said wheel carried by said axles, a compression spring interposed between said wheel and said collar, urging said wheel against said outer limiting means, and cooperative braking members, respectively carried by said wheel and said collar, and held in spaced relation by said spring, and said spring is compressible by lateral thrust of said plane when said landing wheel is functioning, to permit braking contact of said braking members.

11. In an airplane having laterally disposed axles on opposite sides of its longitudinal axis, and landing wheels journalled on said axles, antiground-loop braking means, said wheels being shiftable along their respective said axles, each said axle carrying an abutment spaced inwardly from said wheel and means limiting outward wheel shift, resilient means, compressible under side thrust of said plane, interposed between said wheel and said abutment, urging said wheel against said outer limiting means; a first braking member non-rotatively carried by said abutment, and a cooperative braking member rotatively carried by said wheel in normally spaced relation with respect to said first braking member and shiftable into braking relation therewith by compression of said resilient member under said side thrust of said plane when said landing wheels are functioning.

12. In an airplane having laterally disposed axles on opposite sides of its longitudinal axis, and landing wheels journalled on said axles, antiground-loop braking means, said wheels being shiftable along their respective said axles, each said axle carrying an abutment spaced inwardly from said wheel and means limiting outward wheel shift, a compression spring, compressible under side thrust of said plane, interposed between said wheel and said abutment, urging said wheel against said outer limiting means; a first braking member non-rotatively carried by said abutment, and a cooperative braking member rotatively carried by said wheel in normally spaced relation with respect to said first braking member and shiftable into braking relation therewith by compression of said compression spring under said side thrust of said plane when said landing wheels are functioning.

13. An antiground-loop airplane landing gear, including laterally disposed axles, and landing wheels journalled, and longitudinally shiftable on, said axles, each wheel and axle assembly including inner and outer shift-limiting means, said inner means including a member spaced axially from said wheel, and interposed resilient means urging said wheel against said outer means; cooperative braking members respectively carried by said wheel and said axle and held in spaced relation by said resilient means, said resilient means being compressible by side thrust of said plane when said wheels are functioning to permit braking contact of said braking members.

14. An antiground-loop airplane landing gear, including laterally disposed axles, and landing wheels journalled, and longitudinally shiftable on, said axles, each wheel and axle assembly including inner and outer axially disposed shift-limiting means, said inner means including an abutment member spaced axially from said wheel, and an interposed compression spring urging said wheel against said outer means; cooperative braking members respectively carried by said wheel and said axle and held in spaced relation by said spring, said spring being compressible by side thrust of said plane when said wheels are functioning, to permit braking contact of said braking members.

15. In an airplane having landing wheels, axle means journalling and shiftable with relation to said wheels, braking means for each said wheel, each comprising a wheel carried braking member and a complementary axle carried braking member, and resilient means urging said members into spaced relation, each said braking means being separately responsive to side thrust of said airplane toward the wheel related to said braking means while said wheel is in ground contact.

16. In an airplane having a pair of laterally spaced landing wheels, axle means journalling and axially shiftable with relation to said wheels, braking means for each said wheel, each comprising a wheel carried braking member and a complementary axle carried braking member said axle means extending oppositely in rigidly fixed relation substantially at right angles to the longitudinal axis of said plane during ground contact of said wheel, each said braking means being separately responsive to side thrust of said airplane toward the wheel related to said braking means while said wheel is in ground contact.

17. In an airplane having landing wheels, axle means journalling and axially shiftable with relation to said wheels; braking means for each said wheel, each said means comprising a wheel carried braking member, and a complementary axle carried braking member and means urging said members apart.

18. In an airplane having landing wheels, axle means journalling and axially shiftable with relation to said wheels braking means for each said wheel, each comprising complementary braking members means urging said member into spaced relation, said members being shiftable into braking contact upon shift of said axle means responsive to side thrust of said airplane toward the wheel related to said braking means while said wheel is in ground contact.

19. An antiground-loop brake for an airplane, having a pair of landing wheels on opposite sides of said plane, and axles independently mounting said wheels, for rotation and axial shift, said axles projecting laterally and rigidly away from said plane during ground contact of said wheels, means substantially free from braking action limiting shift of said wheels outward along said axles, and independent braking means for each said wheel, each respectively comprising a brake member fixedly secured to the inner side of a said wheel and a complementary brake member secured to the related said axle inward of said wheel and cooperating with said wheel brake member to effect braking on said wheel under side thrust of said plane toward said wheel.

20. In an antiground-loop brake for an airplane, having a pair of landing wheels on opposite sides of said plane, a wheel assembly including an axle, a wheel mounted on said axle for rotation and axial shift, said axle being mounted to project laterally and rigidly from said plane during ground contact of said wheel, means substantially free from braking action limiting shift of said wheel outward along said axle, and braking means comprising a brake member fixedly secured to the inner side of said wheel and a complementary brake member secured to said axle inward of said wheel, cooperating with said wheel brake member to effect braking action on said wheel under side thrust of said plane toward said wheel.

21. In an antiground-loop brake for an airplane, having a pair of landing wheels on opposite sides of said plane, a wheel assembly including an axle, a wheel having a hub portion mounted for rotation and axial shift along said axle, said axle projecting laterally and rigidly away from said plane during ground contact of said wheel, means substantially free from braking action limiting shift of said hub portion outward along said axle, and braking means for said wheel, comprising a brake member fixedly secured to the inner end of said hub portion, and a brake member secured to said axle and cooperating with said hub brake member, to effect braking action of said wheel under side thrust of said plane toward said wheel.

HARRY L. McPHERSON.

REFERENCES CITED

The following references are of record in the file of this patent:

UNITED STATES PATENTS

| Number | Name | Date |
|---|---|---|
| 1,810,054 | Miller | June 16, 1931 |
| 1,845,345 | Sauzedde | Feb. 16, 1932 |